United States Patent [19]

Beer et al.

[11] Patent Number: 5,014,762
[45] Date of Patent: May 14, 1991

[54] ANGLED OVERLAY BELT FOR TIRES

[75] Inventors: Klaus Beer, Stow; Gary W. Richards, Clinton; Thomas R. Oare, Suffield; Thomas A. Brown, Akron; Thomas H. Wells, Copley, all of Ohio

[73] Assignee: The Goodyear Tire & Rubber Company, Akron, Ohio

[21] Appl. No.: 357,149

[22] Filed: May 26, 1989

[51] Int. Cl.⁵ .......................... B60C 9/18; B60C 9/24; B60C 9/28
[52] U.S. Cl. .................................... 152/532; 152/534; 152/536
[58] Field of Search ............... 152/536, 535, 534, 531, 152/538, 526, 528, 532, 533

[56] References Cited

U.S. PATENT DOCUMENTS

| | | | |
|---|---|---|---|
| 3,233,649 | 2/1966 | Jolivet et al. | 152/528 |
| 3,637,003 | 1/1972 | Clapson . | |
| 4,050,497 | 9/1977 | Pakur et al. | 152/528 |
| 4,129,162 | 12/1981 | DeWitt . | |
| 4,142,568 | 3/1979 | Kleijivegt . | |
| 4,282,917 | 8/1981 | Pommier . | |
| 4,284,117 | 8/1981 | Pogue et al. . | |
| 4,325,423 | 3/1982 | Seitz et al. . | |
| 4,360,397 | 11/1982 | Coretta . | |
| 4,498,514 | 2/1985 | Maathuis et al. | 152/531 |
| 4,518,023 | 5/1985 | Yamaguchi et al. | 152/528 |

FOREIGN PATENT DOCUMENTS

| | | |
|---|---|---|
| 2201623 | 7/1972 | Fed. Rep. of Germany ...... 152/531 |
| 2821093 | 11/1979 | Fed. Rep. of Germany . |
| 2824357 | 12/1979 | Fed. Rep. of Germany . |
| 1416538 | 9/1965 | France . |
| 53205 | 3/1984 | Japan .................................. 152/535 |
| 124407 | 7/1984 | Japan .................................. 152/526 |
| 63-125406 | 5/1988 | Japan . |
| 63-125407 | 5/1988 | Japan . |
| 85964 | 1/1986 | Luxembourg . |

Primary Examiner—Michael W. Ball
Assistant Examiner—Gregory J. Wilber
Attorney, Agent, or Firm—David E. Wheeler; R. J. Slattery, III

[57] ABSTRACT

A pneumatic tire (10, 40) having a belt reinforcing structure (24) located between the carcass (12) and the tread portion (20) is reinforced with an overlay belt (30) located between the belt reinforcing structure (24) and the tread (20). The overlay belt (30) has a plurality of parallel cords (32) oriented at an angle with respect to the equatorial plane (EP) of the tire. The angle of the cords (32) is between 9° to 24° degrees. The overlay can be used by itself or in conjunction with a pair of belt reinforcing strips (42) located radially outwardly along both axial edges (46, 48) of one of the belts (26, 28) of the belt reinforcing structure (24). The belt reinforcing strips (42) also contain a plurality of cords (50) oriented at an angle of from 9° to 24° with respect to the equatorial plane of the tires.

16 Claims, 4 Drawing Sheets

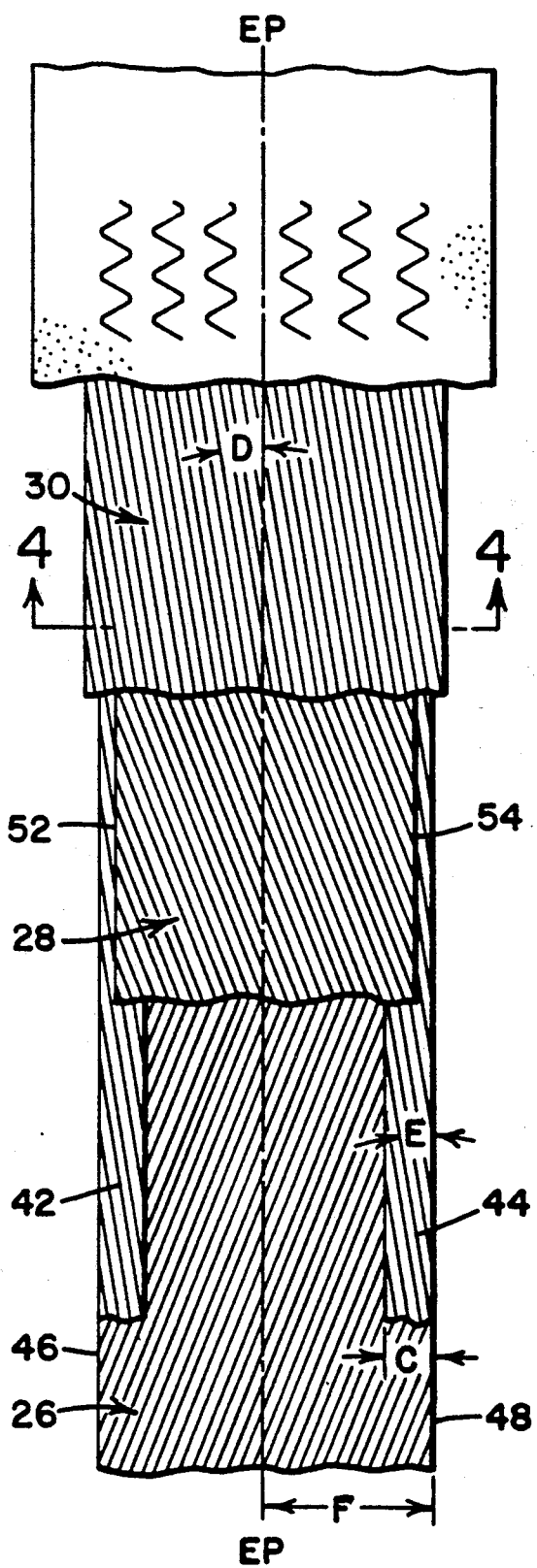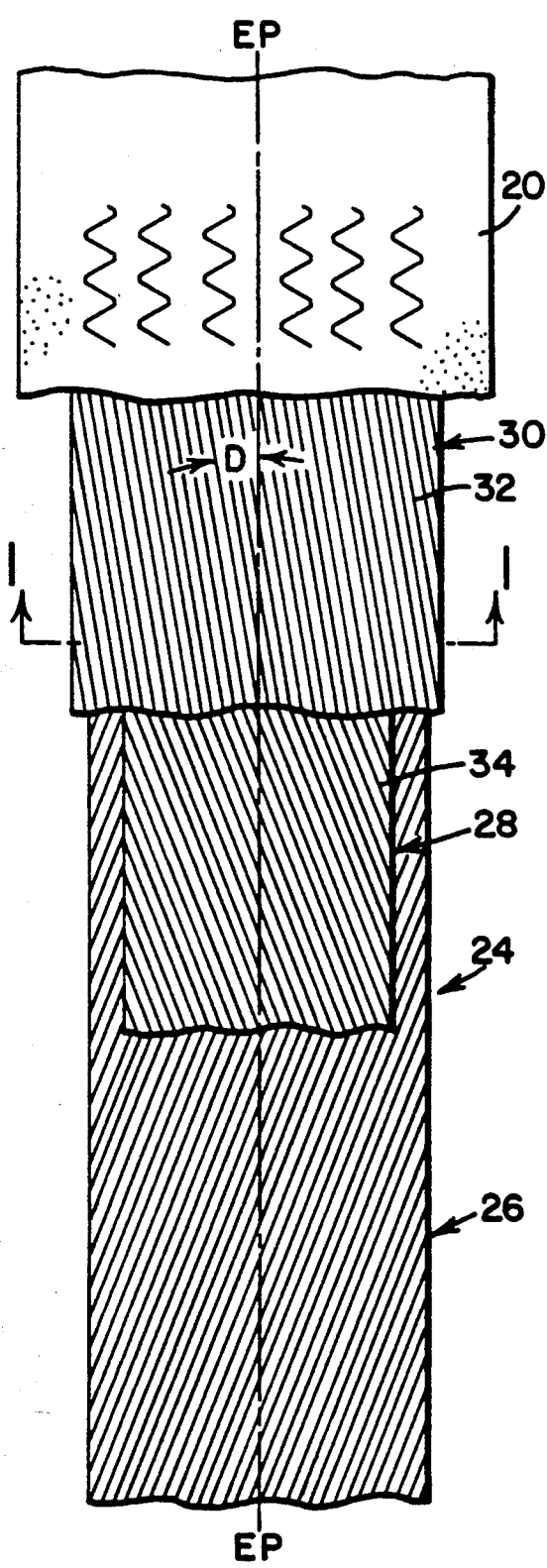

ANGLED OVERLAY BELT FOR TIRES

BACKGROUND

This invention relates to radial carcass pneumatic tires and in particular to automobile tires. More particularly this invention relates to high performance or speed rated tires.

Typically radial carcass tires have a circumferentially extending belt reinforcing structure located between the carcass and the tire tread for reinforcing the crown area of the tire. It is known to have a textile cord reinforced overlay belt located radially outward of the belt structure in order to reinforce the structure against centripetal and/or centrifugal forces encountered during operation. These overlays are generally formed from an elastomeric ply reinforced by cords which extend substantially circumferentially around the tire and are oriented at an angle of about 0° degrees with respect to the equatorial plane of the tire. As used herein the equatorial plane (EP) means the plane perpendicular to the tire's axis of rotation and passing through the center of its tread. The overlay generally forms one or more complete turns around the belt structure.

It is common for the overlay to comprise an annular ply having end portions which overlap to form a splice. The area of overlap can cause a problem with tire uniformity in that it provides an unbalanced portion of the tire. This uniformity problem has increased as the aspect ratios have decreased. The lower aspect ratio tires allow the uniformity caused by the overlap to show through easier. Furthermore during the manufacture of the tire, the overlap splice is subject to loads that can cause a deformation at the splice and may even pull the splice apart.

One prior art attempt to reduce these problems has involved using a straight line splice formed at an angle to the circumferential direction of the tire, e.g. 30°-45°; (See e.g. LU-A-85964). This method, while reducing the distortion of the underlying belts by reducing the slippage at the overlap region of the overlay has not completely eliminated it.

Another attempt has been to give the overlap portion of the overlay a particular shaped configuration, such as a zig-zag (See U.S. Pat. No. 4,325,423). This method still retains localized stress distribution over a relatively small portion of the circumference of the tire and belt distortion cannot be completely avoided.

Other methods or solutions which have been proposed result in costly manufacturing procedures (either time and/or money). For example DE -A-2,824,357 and DE -A-2,821,093 require a single turn overlay to be preassembled from several smaller sections while U.S. Pat. No. 4,284,117 uses single yarn reinforcing cords which are spirally wrapped around the belts to eliminate the slippage of the overlay.

SUMMARY OF THE INVENTION

It therefore is an object of the present invention to provide a pneumatic tire which is durable at high speeds and which at the same time has a high degree of uniformity.

It is also an object of the invention to minimize or eliminate the overlap or splice of the overlay.

It is also an object of the invention to minimize or eliminate the overlap or splice of belt reinforcing strips.

It is further an object of the invention to provide an overlay which eliminates or reduces the uniformity problems associated with the prior art while being capable of being produced in a cost-effective manner.

It is a feature of this invention to provide an overlay having cords which are angled with respect to the equatorial plane of the tire.

It is a feature of this invention to provide belt reinforcing strips which have cords that are angled with respect to the equatorial plane of the tire.

It is a feature of the invention to provide a butt splice which is oriented at an angle which is parallel with the overlay cords.

It is an advantage of this invention that the uniformity of the tire is improved by equalizing the tension of the overlay around the tire.

Another advantage of this invention is elimination of the lap splice.

These and other objects, features, and advantages can be accomplished by a pneumatic tire comprising a radial carcass, a tread portion and a belt reinforcing structure radially interposed between the carcass and the tread portion and a reinforced overlay belt interposed between the belt reinforcing structure and the tread portion, the reinforced overlay belt comprising a plurality of parallel cords oriented at an angle of between 9° and 24° with respect to the equatorial plane of the tire and disposed within an elastomeric material.

These and other objects, features, and advantages can be accomplished by a pneumatic tire comprising a radial carcass, a tread portion and a belt reinforcing structure radially interposed between the carcass and the tread portion, and two belt reinforcing strips, one belt reinforcing strip located circumferentially along an axial edge of a belt layer of said belt reinforcing structure and one belt reinforcing strip located circumferentially along another axial edge of said belt layer, each belt reinforcing strip having an axial width of between 15% and 20% of the axial width of the belt, each belt reinforcing strip comprising a plurality of parallel cords oriented at an an angle of between 9° and 24° with respect to the equatorial plane of the tire and disposed within an elastomeric material.

BRIEF DESCRIPTION OF THE DRAWINGS

The following is a brief description of the drawings in which like parts may bear like reference numerals and in which:

FIG. 2 is a fragmentary view showing a detail of the overlay belt and the belts of the reinforcing structure of FIG. 1;

FIG. 5 is a fragmentary view showing a detail of the overlay belt, belt reinforcing strips and the belts of the reinforcing structure of FIG. 4.

DESCRIPTION OF THE INVENTION

The following definitions are applicable to this specification, including the claims and wherein:

"Aspect ratio" of the tire means the ratio of its section height to its section width.

"Axial" and "axially" are used herein to refer to lines or directions that are parallel to the axis of rotation of the tire.

"Bead" means that part of the tire comprising an annular tensile member wrapped by cords and shaped, with or without other reinforcement elements such as flippers, chippers, apexes, toe guards and chafers, to fit the design rim.

"Inner" means toward the inside of the tire and "outer" means toward its exterior.

"Radial" and "radially" are used to mean directions radially toward or away from the axis of rotation of the tire.

"Section height" means the radial distance from the nominal rim diameter to the outer diameter of the tire at its equatorial plane.

"Section Width Line" (SWL) means a line parallel in the cross-section of the tire to its axis of rotation and which is located at the tire's point of maximum axial width, i.e., at the location at which the tire's section width is measured.

"Tread" means that portion of a tire that comes into contact with the road when the tire is normally inflated and under normal load.

Figure 1:
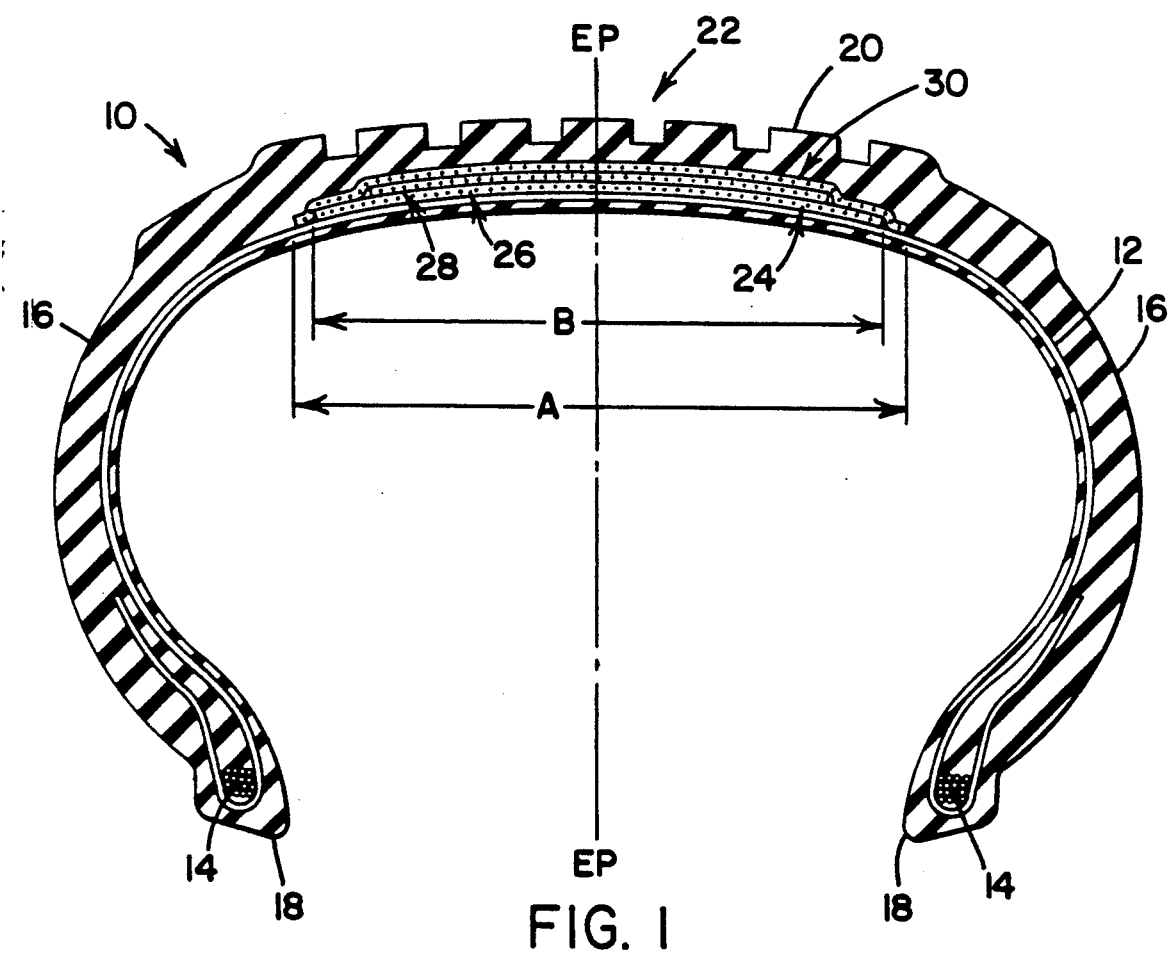
FIG. 1 is a cross sectional view through a pneumatic tire according to one embodiment of the invention.

Referring now to FIGS. 1 and 2, there is illustrated a pneumatic tire shown generally at reference numeral 10, according to one embodiment of this invention. The tire 10 has a radial carcass ply 12 extending between a pair of annular beads 14. A sidewall 16 extends radially outwardly from a bead portion 18 containing the beads 14 therein to a ground contacting tread portion 20. The tire is reinforced in the crown region 22 by a belt reinforcing structure 24. The belt reinforcing structure 24 is located between the carcass plies 12 and the tread portion 20. The belt reinforcing structure 24 has at least 2 layers or belt plies 26, 28 of parallel cords, woven or unwoven, underlying the tread 20, unanchored to the bead 14 and having both left and right cord angles in the range from 17° to 27° with respect to the equatorial plane (EP) of the tire (10).

As used herein and including the claims "cord angle" means a cord that crosses the equatorial plane (EP) at an acute angle, either left or right, in a plan view of the tire, formed by a cord with respect to the equatorial plane. If the cord does not cross the equatorial plane (EP), the "cord angle" means the acute angle formed by the cord with a circumferential line in the ply. The circumferential line passes through a point at which the "cord angle" is to be measured and is contained in a plane parallel with the equatorial plane. The left or right orientation of a cord not passing through the equatorial plane is determined by what the orientation would be were the cord to be extended cross such plane while remaining in the tire. The "cord angle" is measured in a cured but uninflated tire.

A reinforced overlay belt 30 is located radially outwardly of the belt reinforcing structure 24. The reinforced overlay belt 30 has an axial width "A" which is larger than the axial width "B" of the widest belt of the belt reinforcing structure 24. In practice the axial width "A" of the reinforced overlay belt 30 will be between 3 and 15 millimeters wider per side than the axial width "B" of the widest belt of the belt reinforcing structure 24. Typically, the widest belt will be the radially innermost belt 26.

The reinforced overlay belt 30 comprises at least one layer or ply of parallel cords 32 unanchored to the bead and having either a left or right cord angle "D" in the range from 9° to 24° with respect to the equatorial plane (EP) of the tire.

It is preferred however that the parallel cords 32 of the reinforced overlay belt 30 are oriented in the same angular direction (left or right) as the cords 34 of the radially outermost belt layer 28 of the belt reinforcing structure 24. With the cords of the overlay belt oriented in the opposite angular direction (left or right) as those of the radially outermost belt layer there will be a shift in the positive direction of the ply steer residual self-aligning torque relating to vehicle pull as defined by the SAE from those tires having the same angular direction (left or right) for the overlay and the radially outermost belt. It is further preferred that the cord angles of the cords 32, of the overlay 30, be in the range of 9° to about 12°. This range combines good uniformity with a high speed rating. However, due to this low angle it may be difficult to produce because bias cutters may not be able to cut in this angular range. Therefore it is believed that the range from about 16° to about 24° might be the more practical range due to the limitations of equipment.

The overlay belt may comprise one or more belts or layers. If a second belt or layer is used it is preferred that the cords of both layers have the same left or right orientation. It is further preferred that the cords of one layer are parallel with the cords of the other overlay belt layer.

It is also preferred that the cords 32 of the overlay 30 are oriented at a different angle than those of the belts of the belt reinforcing structure. It is believed that the cords of the overlay should be from about 2° to about 12° less than the cords of the outermost belt, with a more preferred range being from 5° to about 10°.

Figure 3:
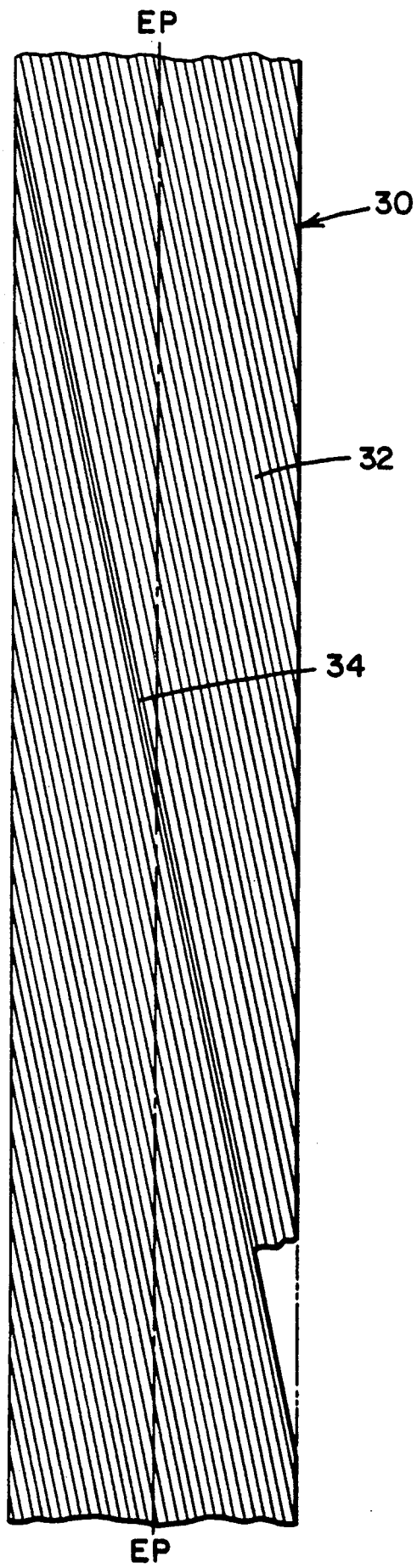
FIG. 3 is a detail view of the splice portion of the overlay belt.

Now referring to FIG. 3, there is illustrated a view of the splice portion 34 of the overlay belt 30. The splice portion 34 is a butt splice oriented at the same angle as the cords of the overlay. In other words the butt splice is parallel to the cords of the overlay and hence is also in the range of 9° to about 24°. The angled cords 32 of the overlay 30 coupled with the angled spliced portion 34 provide an equalization of the tension of the overlay belt around the tire. As the overlay undergoes tension, the cords change their angular orientation with the equatorial plane and pantograph with the cords of the radially outermost belt of the belt reinforcing structure. Furthermore with a zero degree overlay the ends of the cords are restrained by the overlap portion. In that the ends of the cords are fixed, the material used for the cords must then be capable of stretching, elongating, to compensate for the tension and stresses induced during operation. Generally this has resulted in the use of materials with high elongation, such as nylon. However, with the angled overlay, the cords of the overlay are cut at both ends and are each free to move independently of each other. In other words, the cords of the angled overlay are free to slide independently past one another like a belt. In this manner the tension is reduced or equalized about the tire. This equalization of tension reduces the distortion of the underlying belts by reducing the slippage in the splice portion which thereby improves the uniformity of the tire.

Figure 4:
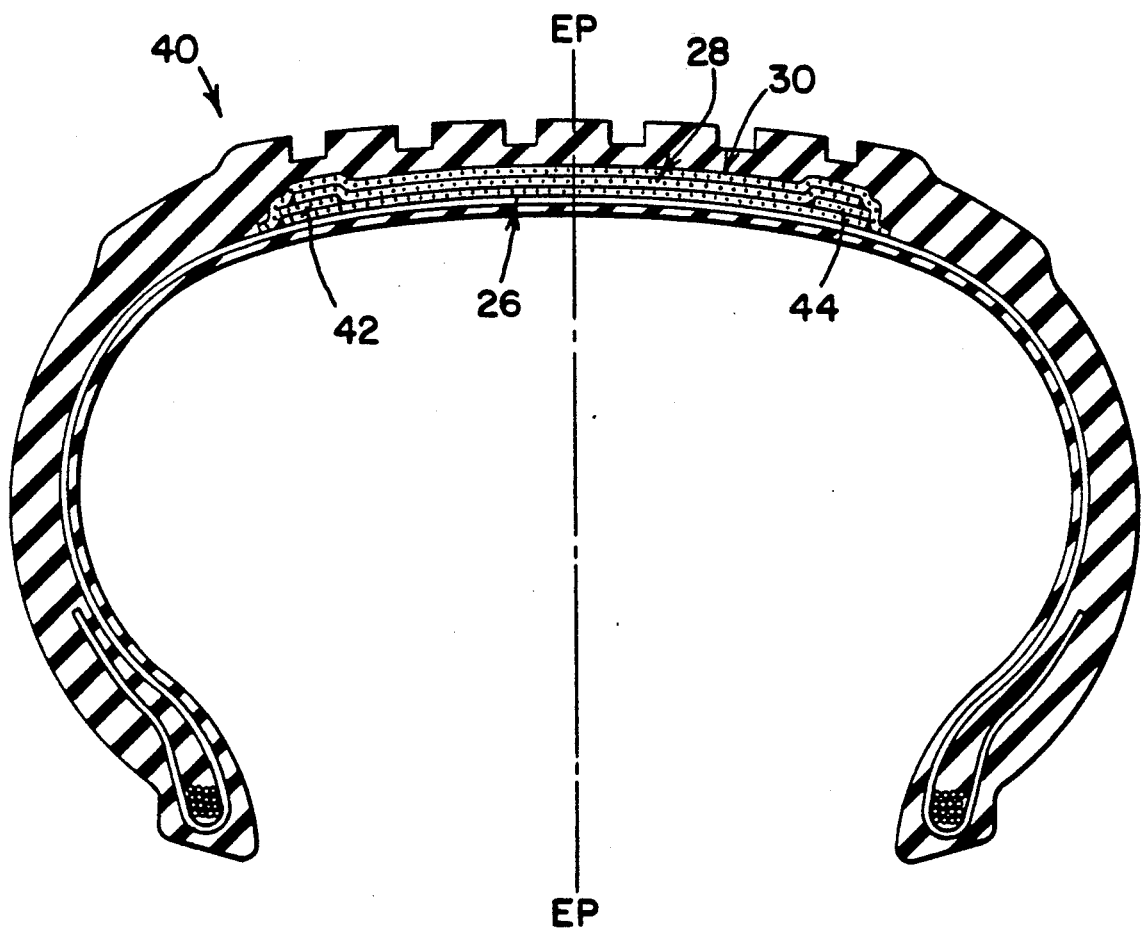
FIG. 4 is a cross sectional view through a pneumatic tire according to another embodiment of the invention.

Now referring to FIGS. 4 and 5, there is illustrated a pneumatic radial tire, shown generally by reference numeral 40, illustrating an alternate embodiment of the invention. In this embodiment the belts 26, 28 of the belt reinforcing structure 24 are further reinforced by two belt-reinforcing strips 42 and 44 located circumferentially along an axial edge 46 and 48 of the inner belt layer 26 of the belt reinforcing structure 24. Each belt reinforcing strip 42 and 44 has an axial width "C" of between 15% and 20% of the axial width "F" of the belt 26. Each belt reinforcing strip 42, 44 has a plurality of parallel cords 50 oriented at an angle "E" of between 9° and 24° with respect to the equatorial plane (EP) of the tire 40 and are disposed within an elastomeric material. Normally it is preferred that the cord angle of the belt-reinforcing strips be the same as the cord angle of the reinforced overlay belt 30 and having the same left or right angular orientation.

Although the belt reinforcing strips 42 and 44 are shown located along the axial edge of the inner belt layer 26, an alternative embodiment would be to locate them along the axial edges 52 and 54 of the radially outermost belt 28. In that instance the axial width of the strip would be 15% to 20% of the axial width of the belt 28.

In general, the belt reinforcing strips are used in conjunction with the angled overlay. However, the belt reinforcing strips may be used independently of the overlay or even used with 0° overlay. In this embodiment, it is preferred that the angular orientation be the same as the top belt.

In some applications, only one layer or wrap of the reinforced overlay belt is required. As speed requirements are increased two layers or wraps of the overlay may be required or in the alternative one layer or wrap of the overlay and one pair of reinforcing strips. As speed requirements are further increased, two or more layers or wraps of the overlay along with at least one pair of belt-reinforcing strips located along the edges of a belt layer of the belt reinforcing structure may be required.

In that the tension stresses induced within the cords of the overlay and the reinforcing strips have been reduced as set forth above, the cords may be comprised of a material that has a lower elongation than what has been typically used before. In other words materials having lower elongations than the commonly used nylon may be used. For example, materials such as fiberglass, metal, or an aromatic polyamide such as manufactured by the Goodyear Tire & Rubber Company under the Trademark Flexten ™ may be used. Other materials that may be used for the manufacture of the cords would also include those such as nylon, polyester, and rayon.

Utilizing TAGUCHI Analysis, tires having different cord materials were tested and compared to two different control groups and the results are set forth in Table 1. All the tires were size P215/60HR14 having an overlay and a pair of reinforcing strips. The difference between the control group 1 and control group 2 is that the first group had the reinforcing strips on the radially outermost belt while the second had them along the radially innermost belt. The overlays of the control groups were all at 0°, while the test groups all had angled overlays and angled reinforcing strips according to the invention. Specifically the tires of test group 1 had cords comprising High Nylon 33, meaning a high load at specified elongation (LASE) and having 33 ends per inch. The tires of test group 2 had cords of Low (LASE) Nylon having 22 ends per inch while test groups 3 and 4 were comprised of polyester having 30 ends per inch and Rayon of 22 ends per inch respectfully. (It is understood that the invention is not be limited to these four disclosed cord materials.)

Uniformity is illustrated by the Radial Force (RF), radial force of the first Harmonic (R1H), the radial run out (RRO), and the lateral force (LF). In each of these measurements, a lower number indicates a better result. In each of the test groups they all showed significant improvement over the control tires for radial force (RF), first Harmonic (R1H) and radial run out (RRO). In the category of lateral force all but the first test group equaled or exceeded both control groups. As is also readily apparent, the test tires still maintained good speed rating although somewhat lower than the control.

TABLE 1

| Groups | UNIFORMITY | | | | |
|---|---|---|---|---|---|
| | RF (lbs) | R1H (lbs) | LF (lbs) | RRO (1 × 10−3 in) | High Speed MPH |
| Control 1 | 26.8 | 15.8 | 10.8 | 40.0 | 133.5 |
| Control 2 | 32.9 | 23.4 | 13.3 | 44.4 | 127.3 |
| Test 1 33 EPI High Nylon | 20.4 | 12.6 | 11.9 | 25.2 | 124.2 |
| Test 2 22 EPI Low Nylon | 17.8 | 10.9 | 10.7 | 21.2 | 119.5 |
| Test 3, 30 EPI Polyester | 17.6 | 11.0 | 9.5 | 22.2 | 117.2 |
| Test 4 22 EPI Rayon | 16.3 | 8.8 | 10.6 | 19.9 | 126.5 |

Expanding upon the analysis of Table 1 experiments were conducted to further compare the speed levels of tires according to this invention, such as illustrated in Tables 2 and 3. In tables 2 and 3, all the tires were size P215/60HR14, having black sidewalls and each having an overlay. The 3 tires of the control group all had an overlay at 0° while the tires of the test groups all had an overlay having a cord angle of 12° left. The speed level is the speed that the tire successfully ran at on a drum tester for 10 minutes, the speeds being increased until failure. Therefore, if a tire ran at 136 MPH for 10 minutes and then was run at 142 MPH and failed after 9 minutes the speed level passed would be the 136 MPH level. In almost all the test cases the tires either equaled or surpassed the control tires.

In table 3 all the tires had one overlay, the cords of the control tires being at 0°, the cords of the test tires at 12° and each control and test tire having a pair of reinforcing strips located along the edges of the radially innermost belt, the cords of the control and the test tires of these strips being oriented at 12°. All the test tires indicated an increase in speed from those of table 2 and a considerable increase in speed over the control tires.

TABLE 2

| GROUP | MAT'L OF CORDS | SPEED LEVEL (MPH) PASSED FOR TIRE NO. | | |
|---|---|---|---|---|
| | | 1 | 2 | 3 |
| Control | Lo Nylon, 22 EPI | 130 | 136 | 130 |
| Test No 1 | Rayon, 22 EPI | 130 | 136 | 142 |
| Test No 2 | Hi Nylon, 33 EPI | 142 | 142 | 136 |
| Test No 3 | Nylon, 27 EPI | 149 | 136 | 136 |

TABLE 3

| GROUP | MAT'L OF CORDS | SPEED LEVEL (MPH) PASSED FOR TIRE NO. | | |
|---|---|---|---|---|
| | | 1 | 2 | 3 |
| Control | Lo Nylon, 22 EPI | 130 | 130 | 130 |
| Test Group No 1 | Rayon, 22 EPI | 142 | 142 | 142 |
| Test Group No 2 | Hi Nylon, 33 EPI | 149 | 149 | 149 |
| Test Group No 3 | Nylon, 27 EPI | 142 | 142 | 142 |

The above invention is especially useful with tires having an aspect ratio from 0.30 to 0.75 and is believed to be even more beneficial to lower aspect ratios such as from 0.30 to 0.50. The reason for this is the uniformity problems associated with low and lower aspect ratio tires as set forth above.

These descriptions and details have been shown for the purpose of illustrating this invention and it will become apparent to those skilled in the art that various changes and/or modifications may be made therein without departing from the original spirit or scope of the invention.

It is claimed:

1. A pneumatic tire comprising a radial carcass, a tread portion and a belt reinforcing structure comprising reinforcing layers radially interposed between the carcass and the tread portion, and a reinforced overlay belt interposed between the belt reinforcing structure and the tread portion, the reinforced overlay belt comprising a plurality of parallel cords oriented at an angle of between 9° and 24° with respect to the equatorial plane of the tire and disposed within an elastomeric material wherein the axial width of said reinforced overlay is greater than or equal to the axial width of the belt reinforcing structure and wherein the parallel cords of the reinforced overlay belt are oriented in the same angular direction as cords of an adjacent radially outermost reinforcing layer of the belt reinforcing structure and wherein said overlay belt is spliced in said tire such that said splice is parallel to said parallel cords in said overlay belt.

2. The tire of claim 1 further comprising two belt reinforcing strips, one belt reinforcing strip located circumferentially along an axial edge of a belt layer of said belt reinforcing structure and one belt reinforcing strip located circumferentially along another axial edge of said belt layer, each belt reinforcing strip having an axial width of between 15% and 20% of the axial width of the belt, each belt reinforcing strip comprising a plurality of parallel cords oriented at an angle of between 9° and 24° with respect to the equatorial plane of the tire and disposed within an elastomeric material.

3. The tire of claim 1 wherein the cords of the overlay belt are oriented at an angle of between 9° and 12°.

4. The tire of claim 1 wherein the cords of the overlay belt are oriented at an angle of between 16° and 24°.

5. The tire of claim 1 or 3 wherein the aspect ratio is from 0.30 to 0.75.

6. The tire of claim 5 wherein the aspect ratio is from 0.30 to 0.50.

7. The tire of claim 1 wherein the parallel cords of the reinforced overlay belt have an angle from 2° to about 12° less than the cords of the reinforcing belt.

8. The tire of claims 1 or 3 wherein the cords of the overlay are selected from the group consisting of fiberglass, metal, aromatic polyamide, polyester rayon, and polyester.

9. A pneumatic tire comprising a radial carcass, a tread portion and a belt reinforcing structure comprising reinforcing layers radially interposed between the carcass and the tread portion, and two belt reinforcing strips, one belt reinforcing strip located circumferentially along an axial edge of a belt layer of said belt reinforcing structure and one belt reinforcing strip located circumferentially along another axial edge of said belt layer, each belt reinforcing strip having an axial width of between 15% and 20% of the axial width of the belt, each belt reinforcing strip comprising a plurality of parallel cords oriented at an angle of between 9° and 24° with respect to the equatorial plane of the tire and disposed within an elastomeric material wherein the parallel cords of the reinforcing strips are oriented in the same angular direction as cords of a radially outermost belt layer of the belt reinforcing structure.

10. The tire of claim 9 wherein the cords of the reinforcing strips are oriented at an angle of between 9° and 12°.

11. The tire of claim 9 wherein the cords of the belt reinforcing strips are oriented at an angle of between 16° and 24°.

12. A pneumatic tire comprising a radial carcass, a tread portion and a belt reinforcing structure comprising reinforcing layers radially interposed between the carcass and the tread portion, and a reinforced overlay belt interposed between the belt reinforcing structure and the tread portion, the reinforced overlay belt comprising a plurality of parallel cords oriented at an angle of between 9° and 12° with respect to the equatorial plane of the tire and disposed within an elastomeric material wherein the axial width of said reinforced overlay is greater than or equal to the axial width of the belt reinforcing structure and wherein the parallel cords of the reinforced overlay belt are oriented in the same angular direction as cords of an adjacent radially outermost reinforcing layer of the belt reinforcing structure.

13. The tire of claim 12 further comprising two belt reinforcing strips, one belt reinforcing strip located circumferentially along an axial edge of a belt layer of said belt reinforcing structure and one belt reinforcing strip located circumferentially along another axial edge of said belt layer, each belt reinforcing strip having an axial width of between 15% and 20% of the axial width of the belt, each belt reinforcing strip comprising a plurality of parallel cords oriented at an angle of between 9° and 12° with respect to the equatorial plane of the tire and disposed within an elastomeric material.

14. The tire of claim 12 wherein the aspect ratio is from 0.30 to 0.75.

15. The tire of claim 14 wherein the aspect ratio is from 0.30 to 0.50.

16. The tire of claim 12 wherein the parallel cords of the reinforced overlay belt have an angle of from 2° to about 12° less than the cords of the reinforcing belt.

* * * * *